United States Patent
Lipscomb et al.

(10) Patent No.: US 8,235,434 B2
(45) Date of Patent: Aug. 7, 2012

(54) UPRIGHTLY STORABLE FECAL MATTER SCOOPER

(75) Inventors: John M. Lipscomb, Cedarburg, WI (US); Stanley L. Suring, Cedarburg, WI (US)

(73) Assignee: Pioneer Pet Products, LLC, Cedarburg, WI (US)

( * ) Notice: Subject to any disclaimer, the term of this patent is extended or adjusted under 35 U.S.C. 154(b) by 330 days.

(21) Appl. No.: 12/419,776

(22) Filed: Apr. 7, 2009

(65) Prior Publication Data

US 2009/0278366 A1 Nov. 12, 2009

Related U.S. Application Data

(60) Provisional application No. 61/042,958, filed on Apr. 7, 2008.

(51) Int. Cl.
*A01K 29/00* (2006.01)
*E01H 1/12* (2006.01)
(52) U.S. Cl. ............................ 294/1.4; 294/115; 294/179
(58) Field of Classification Search .................. 294/1.3, 294/1.4, 50.8, 55, 115, 179; 15/257.6; 119/161, 119/165; 209/417–419
See application file for complete search history.

(56) References Cited

U.S. PATENT DOCUMENTS

| | | | |
|---|---|---|---|
| 652,077 A | 6/1900 | Burson | |
| 3,328,066 A * | 6/1967 | Johnston | 294/19.1 |
| 3,738,697 A | 6/1973 | Kahan | |
| 3,879,079 A | 4/1975 | Nicholas | |
| 3,942,831 A | 3/1976 | Sosnove | |
| 4,005,897 A | 2/1977 | Smith | |
| 4,225,174 A * | 9/1980 | Hennessy et al. | 294/1.4 |
| 4,247,139 A | 1/1981 | Grieb | |
| 4,248,468 A | 2/1981 | Hastings | |
| 4,316,627 A | 2/1982 | Solypa | |
| 4,838,690 A | 6/1989 | Buckland et al. | |
| 4,958,871 A | 9/1990 | Hemans | |
| 5,056,842 A | 10/1991 | Lindenberg et al. | |
| 5,417,044 A | 5/1995 | Russo | |
| D368,003 S | 3/1996 | Simon | |
| 5,503,442 A | 4/1996 | Lee | |
| 5,601,321 A | 2/1997 | Simon | |
| D409,804 S * | 5/1999 | Nunes | D30/162 |
| 5,921,596 A | 7/1999 | Sheriff et al. | |
| 6,196,600 B1 | 3/2001 | Miller | |

(Continued)

FOREIGN PATENT DOCUMENTS

GB 2095156 9/1982

(Continued)

*Primary Examiner* — Dean Kramer
(74) *Attorney, Agent, or Firm* — Boyle Fredrickson, S.C.

(57) ABSTRACT

A fecal matter scooper having a manipulable handle attached to an elongate handle extension from which a pair of opposable scoop jaws extend that define a fecal matter holding scoop bucket when disposed in a closed position and which define a pedestal or base upon which the scooper can be stored in an uprightly standing position when the jaws are disposed in an open pedestal position. When stored uprightly, the handle can be grasped to pick up and maneuver the scooper without the user having to bend over. A biasing arrangement is disposed in operable cooperation with at least one jaw for urging at least one of the jaws toward such an open pedestal position. In a method of operation, at least one of the jaws is perforate enabling sifting unspoiled litter back into a litter box when removing clumped fecal matter or urine from the litter box.

19 Claims, 18 Drawing Sheets

U.S. PATENT DOCUMENTS

| | | | |
|---|---|---|---|
| 6,209,729 | B1 | 4/2001 | Brouillard |
| 6,234,549 | B1 | 5/2001 | Brownell |
| 6,578,807 | B1 | 6/2003 | Lipscomb et al. |
| 6,976,661 | B2 | 12/2005 | Lipscomb et al. |
| 6,983,966 | B2 | 1/2006 | Azrikam |
| 7,178,843 | B2 | 2/2007 | Askinasi |
| 2002/0038957 | A1 | 4/2002 | Harrison |
| 2002/0185874 | A1 | 12/2002 | Arceo |
| 2004/0066049 | A1 | 4/2004 | Azirkam |
| 2004/0130169 | A1 | 7/2004 | Askingsi |
| 2006/0175849 | A1 | 8/2006 | Warn et al. |
| 2007/0194580 | A1* | 8/2007 | Raasch .......................... 294/1.4 |

FOREIGN PATENT DOCUMENTS

| | | |
|---|---|---|
| GB | 2185434 | 7/1987 |

* cited by examiner

UPRIGHTLY STORABLE FECAL MATTER SCOOPER

CROSS REFERENCE

This application claims the benefit under 35 U.S.C. §119(e) of U.S. Provisional Application Ser. No. 61/042,958, filed Apr. 7, 2008, the entirety of which is expressly incorporated by reference herein.

FIELD

The invention is directed to a scooper for picking up animal feces while the user is standing up and more particularly to a fecal matter scooper that is configured to facilitate pick up and removal of feces and urine clumps from granular or particulate matter, namely litter, as well to a fecal matter scooper that is capable of being self-supported uprightly in a standing up position when not in use.

BACKGROUND

Pets provide a great deal of joy and companionship to persons of all ages, including the elderly and infirm. No matter what the age, it has always been a challenge to dispose of pet fecal matter.

Many types of devices have been developed to facilitate pickup, removal, as well as disposal of fecal matter. Many of these devices are hand-held and require a user to have to bend down close to the ground to pickup or otherwise scoop up the fecal matter using the device. Unfortunately, for the elderly, the infirm and those with back problems, hand-held fecal matter pickup devices are a less than desirable solution.

In response, other types of devices have been developed that permit a user to scoop up fecal matter without having to bend over. Commonly referred to as long-handled fecal matter scoopers, these types of devices are typically equipped with a manipulable handle attached by an elongate extension to a pair of movable scoop jaws. Examples of such long-handled fecal matter scoopers are disclosed in U.S. Pat. Nos. 4,248,468 and 5,601,321.

While long-handled fecal matter scoopers have enjoyed considerable commercial success, improvements nonetheless remain. For example, their scoop jaws are automatically held closed by one or more springs such that storage after use inconveniently requires them to be propped up in a corner, which can result in them falling down, or be laid on the ground or floor. As a result, it can be very difficult for the elderly, the infirm and those with back problems to have to repeatedly bend down and pick up a fecal matter scooper that is laying on the ground or floor.

In addition, for those with indoor pets, such as cats and the like, long-handled fecal matter scoopers are ill suited for use in removing fecal matter from litter boxes. In particular, because these types of fecal matter scoopers employ imperforate scoop jaws, scooping up fecal matter and litter that has clumped from absorbing urine from a litter box inevitably also causes unused litter to be scooped up which undesirably results in a loss of good litter. As a result of these drawbacks, adoption of such long-handled fecal matter scoopers has not been widespread by people who have indoor pets.

What is needed is a long-handled fecal matter scooper that can be more conveniently stored in a manner that makes it easier to access for the elderly, the infirm and for those with back problems. What is also needed is a long-handled fecal matter scooper that can be used to remove fecal matter indoors from litter boxes.

SUMMARY

The present invention is directed to a fecal matter scooper that includes a manipulable handle attached to an elongate handle extension arrangement from which a pair of opposable scoop jaws extend that define a fecal matter holding scoop bucket when the jaws are disposed in a closed position and which define a pedestal or base upon which the scooper can be stored in an uprightly standing position when the jaws are disposed in an open position. When stored uprightly, the handle can be grasped to pick up and maneuver the fecal matter scooper without the user having to bend down. A biasing arrangement is disposed in operable cooperation with at least one of the scoop jaws for urging at least one of the scoop jaws toward an open position where the jaws form such a pedestal.

In a preferred embodiment, manipulation of the manipulable handle is performed by a user to cause at least one of the scoop jaws to move relative to at least one of the other scoop jaws toward the closed position thereby enabling the user to manipulate the handle to close the jaws and scoop up fecal matter. When released, the biasing arrangement automatically urges at least one of the scoop jaws relative to the at least one of the other scoop jaws toward an open, pedestal defining position. When the jaws are disposed in the open, pedestal defining position, the distance between a bottom edge of each one of the jaws and the length of each jaw edge is sufficient to provide a broad and stable base for the fecal matter scooper so as to enable the fecal matter scooper to be stood uprightly upon both jaw edges by itself on a flat surface, such as a floor. Such an open, pedestal defining position also enables the open scoop jaws to rest upon or be inserted into granular material, such as litter, thereby enabling a fecal matter scooper constructed in accordance with the present invention to be uprightly stored in an operating position in a litter box.

The elongate handle extension arrangement has a length sufficient to enable a user to use the fecal matter scooper while standing up. By advantageously configuring the fecal matter scooper so at least one of its jaws can be opened relative to the other one of its jaws, placing the jaws in an open, pedestal defining position, the fecal matter scooper is also conveniently storable in an upright position that enables a user to quickly and easily grab and begin using the scooper without having to bend over.

The elongate handle extension arrangement includes a portion that functions as a frame along with another portion that functions as a connector that is movable relative to the frame and that operatively connects the manipulable handle to at least one of the scoop jaws enabling a user to manipulate the handle to displace at least one of the scoop jaws from a normally biased open position toward a closed position. When disposed in a fully closed position, one of the scoop jaws has at least one outer jaw edge that mates or abuts with at least one outer jaw edge of the other one of the scoop jaws defining a scoop in which fecal matter is releasably retained.

Such an elongate handle extension arrangement can have a portion or otherwise be of tubular construction, such as where at least part of the frame is tubular. Where a tubular frame or tubular frame portion is used, at least a portion of the connector can be disposed within the tubular frame and movable relative thereto to communicate manipulation of the handle to at least one of the scoop jaws to move the at least one of the scoop jaws toward the closed position.

In one preferred embodiment, one or both of the frame and connector can be formed of one or more elongate rails with such a connector rail defining a link that communicates handle displacement to at least one of the scoop jaws. In a preferred embodiment, at least a portion of the frame is formed a pair of spaced apart and longitudinally extending frame rails between which at least one connector rail is disposed. Such a connector rail can be disposed in slidable cooperation with one or both of the frame rails enabling relative longitudinal movement therebetween.

A biasing arrangement is provided in operable cooperation with at least one of the jaws for biasing or urging at least one of the jaws toward an open position that preferably is an open, pedestal defining position that enables the fecal matter scooper to be stood uprightly on its jaws. In one preferred embodiment, the biasing arrangement includes at least one biasing element that is grounded to a portion of the frame and that is in operable cooperation with at least one of the scoop jaws. In one implementation, the biasing element is operatively connected to a frame rail and operatively connected to a portion of the jaw displacing connector. In another implementation, a plurality of biasing elements is employed. Each biasing element can be operatively connected to a frame rail or to a brace outwardly extending from a frame rail, such as a cross brace or strut interconnecting a pair of frame rails. In a preferred embodiment, each biasing element is a spring, preferably a coil spring, captured in tension in a manner that biases at least one of the scoop jaws relative the other one of the scoop jaws toward an open, pedestal defining position.

In one preferred embodiment, the biasing arrangement urges both scoop jaws towards an open, pedestal defining position. In one biasing arrangement, each scoop jaw is biased towards the open, pedestal defining position by a biasing element. In another biasing arrangement, each scoop jaw is biased by a separate biasing element.

Each scoop jaw is pivotally attached to one or both of the frame and connector and can be connected by one or more connecting links or arms. In one preferred embodiment, each jaw is pivotally connected to the jaw along a common axis about which the jaws relatively pivot when moving from an open position toward the closed position.

To enable the fecal matter scooper to be used with granular litter, such as a clumping litter, one or both of the scoop jaws are of perforate construction. In one preferred scoop jaw embodiment, one of the jaws is has a plurality of pairs of through-holes, i.e. at least three through-holes, formed therein having a size of between about one-eighth of an inch in width or diameter and about one-half of an inch in width or diameter to permit unspoiled granular litter to pass through the perforations when the scoop jaws are closed while retaining fecal matter and urine clumps within the closed scoop.

In a method of use, a fecal matter scooper constructed in accordance with the present invention is maneuvered by a user over an area containing fecal matter with the scoop jaws biased open by the biasing arrangement. When the open scoop jaws are positioned on either side of the fecal matter in close proximity thereto, the user manipulates the handle causing relative scoop jaw movement to close the jaws around the fecal matter. The closed jaws form a scoop bucket in which the fecal matter is held, enabling the fecal matter scooper to be further maneuvered to dispose of the fecal matter, such as by placing the closed scoop jaws over a refuse container, bag or the like. Releasing the handle causes the biasing arrangement to urge at least one of the scoop jaws relative to the other one of the scoop jaws toward an open position allowing the fecal matter to fall freely into the refuse container, bag or the like.

Thereafter, the fecal matter scooper can be stood uprightly on its open jaws with its open jaws defining a pedestal upon which the fecal matter scoop is self supporting. It can be stood uprightly on the ground, on the floor or in litter in a litter box indoors where it is used to scoop fecal matter and clumped urine therefrom. When used to remove clumped fecal matter and/or urine in litter in a litter box, perforations in one or both of the scoop jaws allow unused or unspoiled litter to flow out of the scoop back into the litter box as the clumped fecal matter and/or urine in the scoop is being lifted out of the litter box.

DRAWING DESCRIPTION

Preferred exemplary embodiments of the invention are illustrated in the accompanying drawings, in which.

Figure 1:
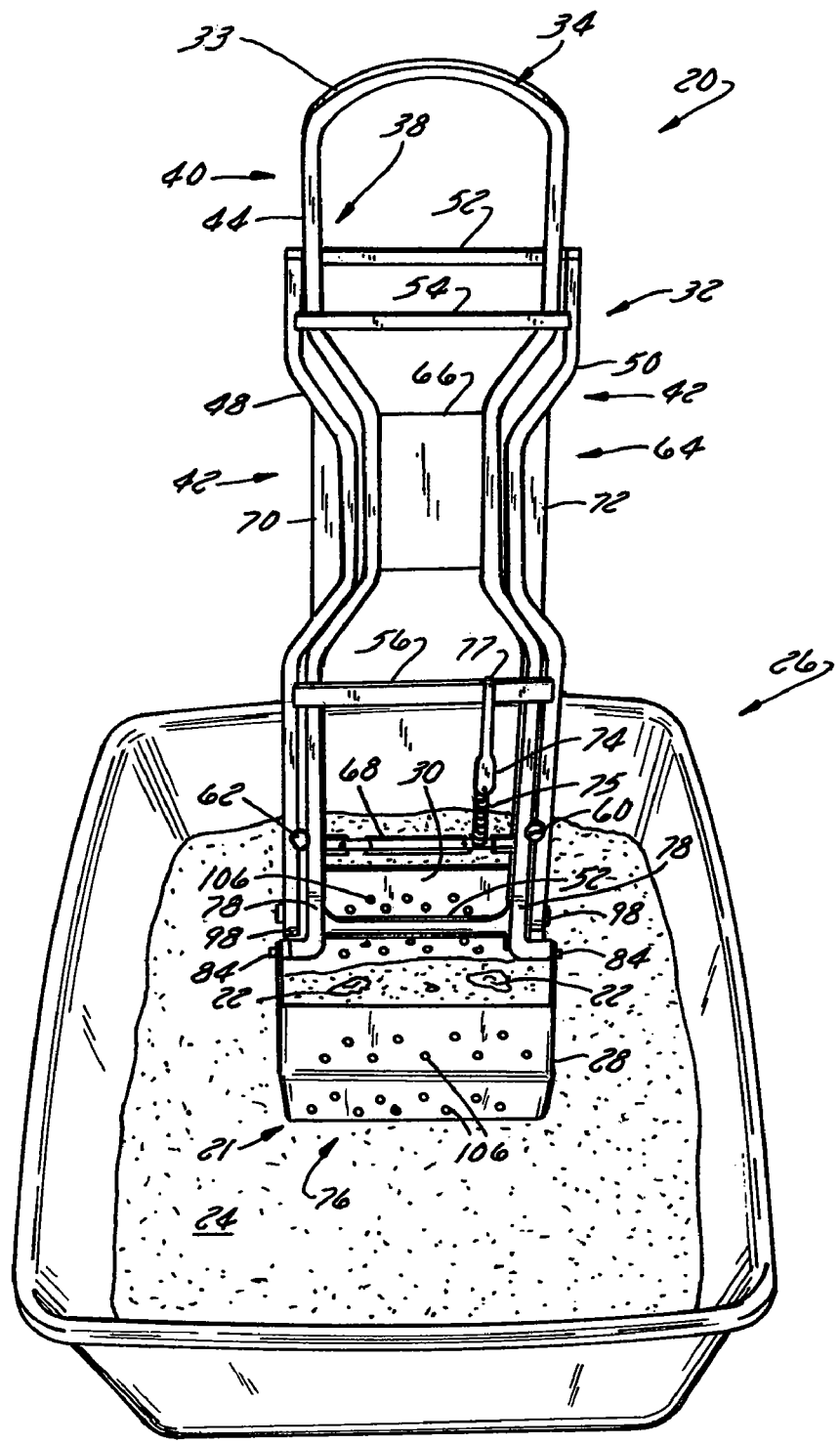
FIG. 1 is a front perspective view of an embodiment of a litter-sifting fecal matter scooper constructed in accordance with the present invention shown standing uprightly in granular litter disposed in a litter box.
Figure 2:
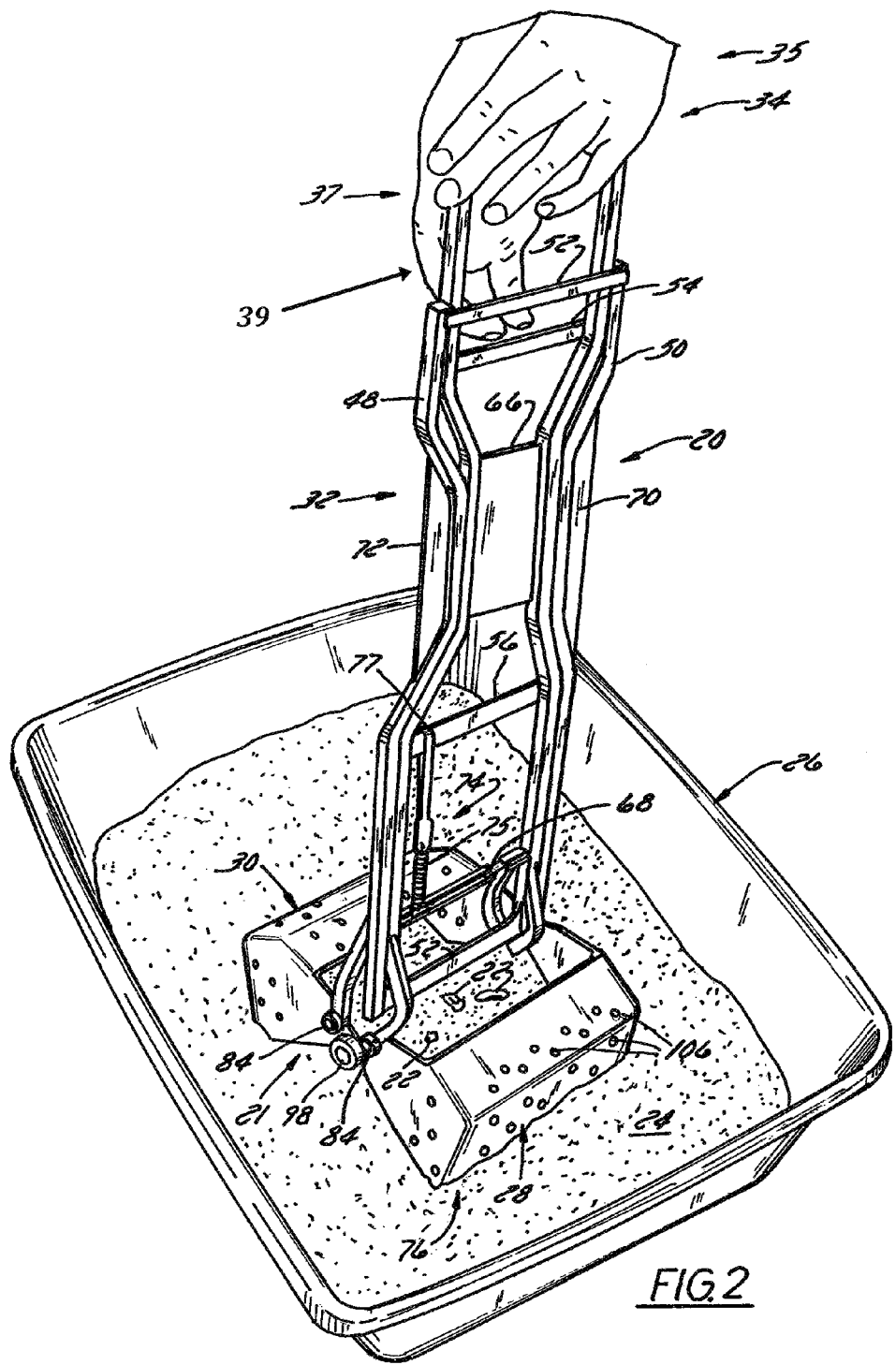
FIG. 2 is a perspective view of the scooper of FIG. 1 being readied for use.

Before explaining embodiments of the invention in detail, it is to be understood that the invention is not limited in its application to the details of construction and the arrangement of the components set forth in the following description and illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION

FIGS. 1-8 illustrate a preferred embodiment of a fecal matter scooper 20 for removing pet fecal matter 22 or the like from particulate matter 24, preferably granular clumping litter composed of at least a plurality of pairs of litter granules, in a container 26, preferably a litter box, so it can be conveniently disposed in the trash. While particularly well suited for use where the pet is a cat, it should be recognized that a fecal matter scooper 20 constructed in accordance with the present invention can be used to remove rabbit, ferret or dog feces as well as clumped spots of urine. It can be used to remove other pet feces and clumped urine spots in litter as well.

The scooper 20 includes a scoop bucket 21 formed of a pair of movable scoop jaws 28, 30, extending outwardly from an elongate handle extension arrangement 32, which has a length long enough where a handle 34 of the scooper 20 can be grasped and manipulated by a user 35 (FIGS. 2 and 3) while the user is standing up. Such a scooper 20 can be equipped with one or more perforate scoop jaws, such as scoop jaws 28', 30' shown in FIGS. 9-12, for facilitating feces and clumped urine spot removal while minimizing loss of unused or unspoiled litter. When not in use, the scoop jaws 28, 30 (or perforate jaws 28', 30') remain open enabling the scooper 20 to be stored upright on the floor 36 (FIGS. 4 and 5) or in litter 24 (FIG. 1) in the litter box 26 in a manner that presents the handle 34 in a convenient, easy to grasp position. The scooper 20 can also be stood upright in a stand or light duty holder (not shown) on its jaws 28, 30, it is desired to place it in a more aesthetically pleasing location that hides both scoop jaws. In a method of cleaning, the opened jaws of the scooper 20 can also be conveniently cleaned in a toilet bowl (not shown) or cleaning station allowing liquid in the toilet bowl or cleaning station to swish around each side of each jaw cleaning and removing any fecal matter that may have stuck to either jaw from the jaw.

The handle extension arrangement 32 includes a frame assembly with a slide arrangement 38, which can be of a trombone slide configuration or the like, formed by inner and outer frames 40, 42 that are movable relative to one another to facilitate opening and closing of the scoop jaws 28, 30. As is best shown in FIGS. 4-7, the inner and outer frames 40, 42 each have a pair of longitudinally or vertically extending frame rails 44, 46 and 48, 50 that are slidably movable relative to one another. A plurality of spaced apart and transversely extending guide braces 52, 54, 56 extend between the outer frame rails 48, 50 with at least one of the guide braces 52 and 56 disposed on one side of the inner frame rails 44, 46 and at least one of the other guide braces 54 disposed on the other side of the inner frame rails 44, 46. As is shown in FIG. 5, there are two spaced apart guide braces 52 and 56 disposed on one side and one guide brace 54 disposed on the other side slidably capturing the inner frame rails 44, 46 between the outer frame rails 48, 50.

Figure 3:
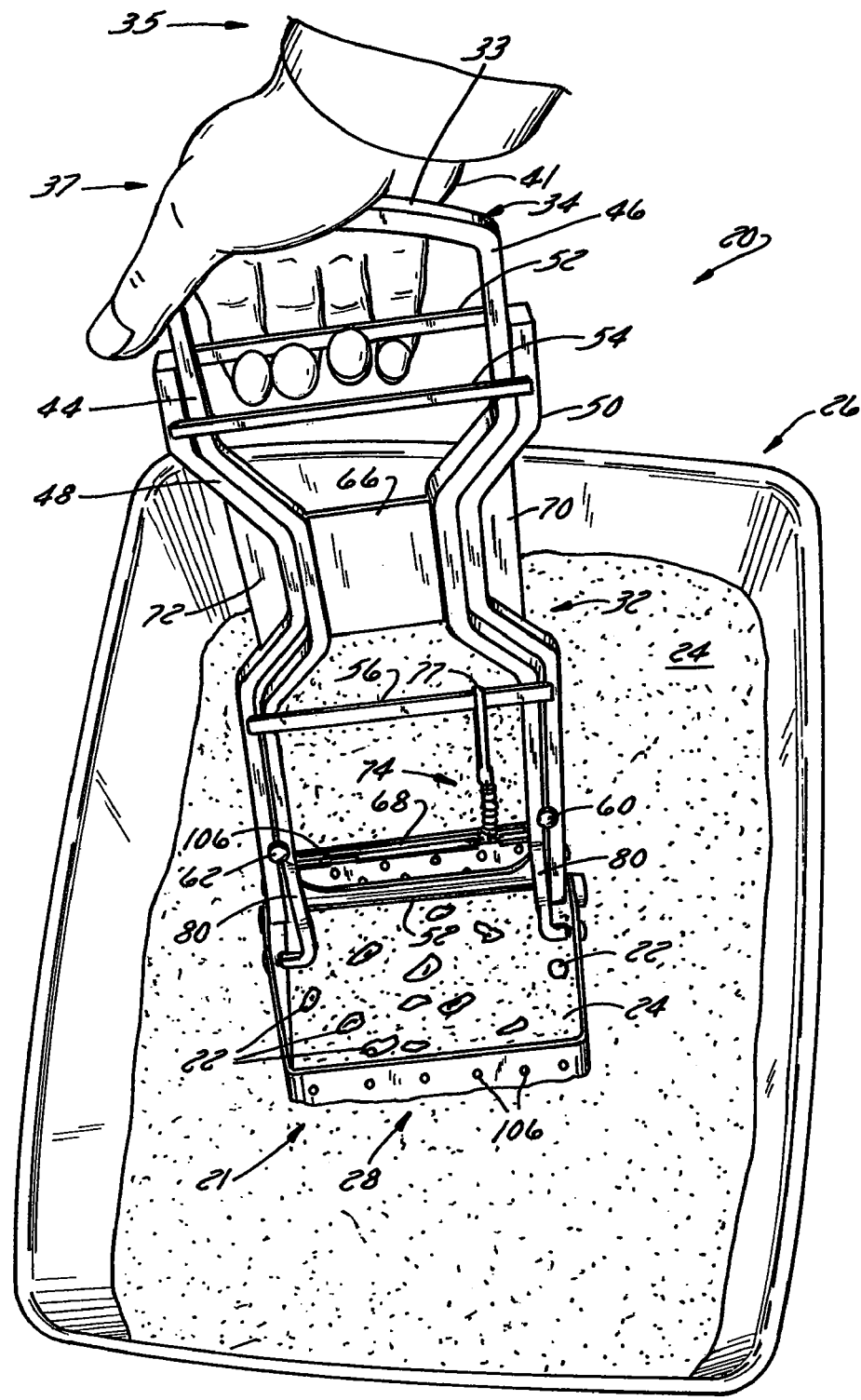
FIG. 3 is a top perspective view of the scooper of FIG. 1 being grasped and manipulated by a user to displace jaws of the scoop bucket causing them to close around feces clumps in the litter in the litter box in the manner shown.

The guide braces 52, 54, 56 along with a bottom strut 58 interconnect the outer frame outer rails 48, 50, help to strengthen and structurally rigidify at least the outer frame 42, if not the entire scooper assembly 20. In addition, the upper-most guide brace 52 serves as a hand grip of the handle 34 that is grasped or otherwise manipulated by a hand 37 (FIG. 3) of a user 35 that is manipulated to open and close the jaws 28, 30 of the bucket 21. For example, as is depicted in FIG. 3, the fingers 39 are wrapped around the upper most guide brace 52 with the palm 41 disposed against a top portion 33 of the handle 34 such that a squeezing action moves the top portion 33 of the handle 34 and brace 52 together thereby bringing the scoop jaws 28, 30 together.

Figure 6:
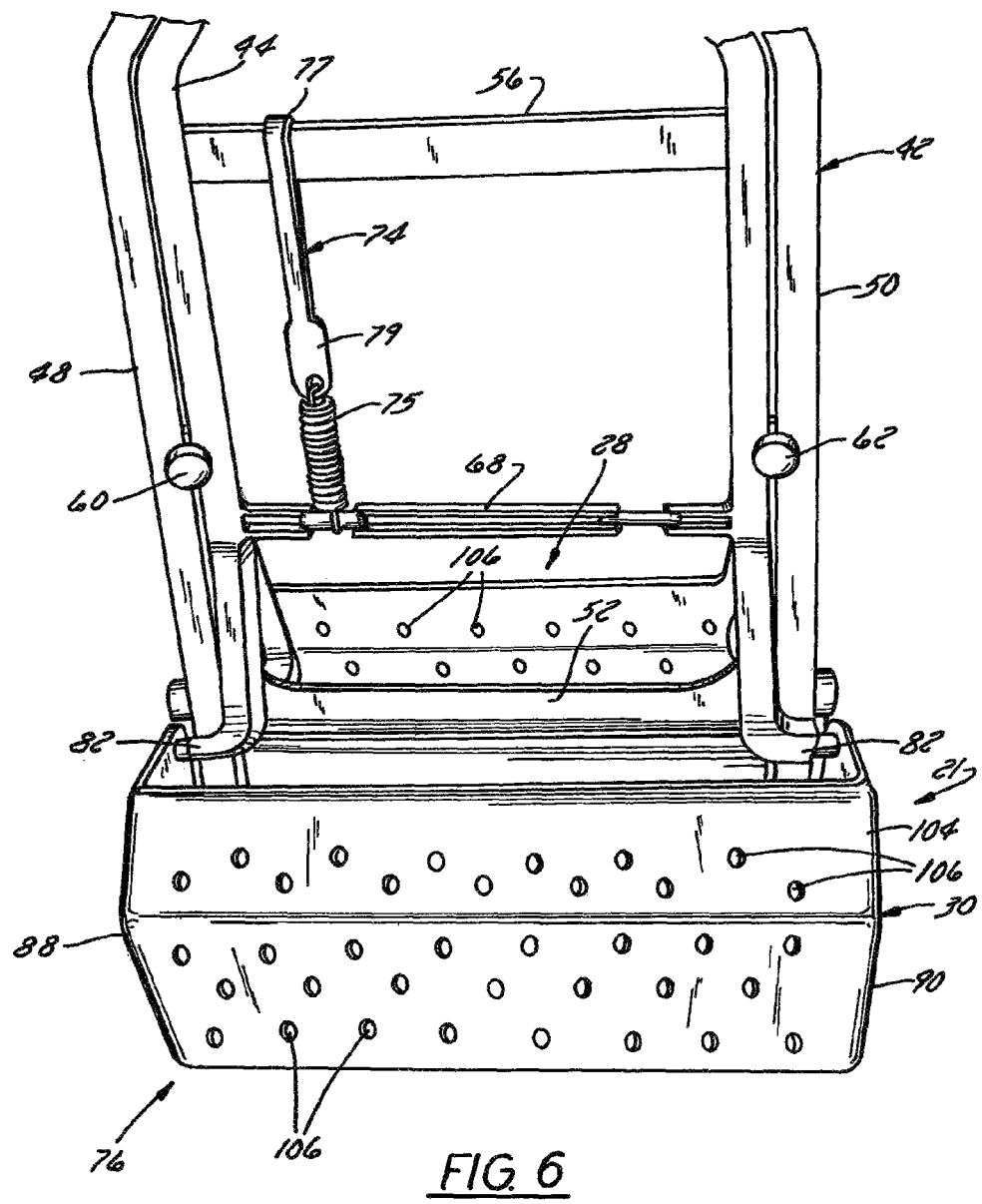
FIG. 6 is an enlarged fragmentary perspective view of the scooper frame and jaws.
Figure 7:
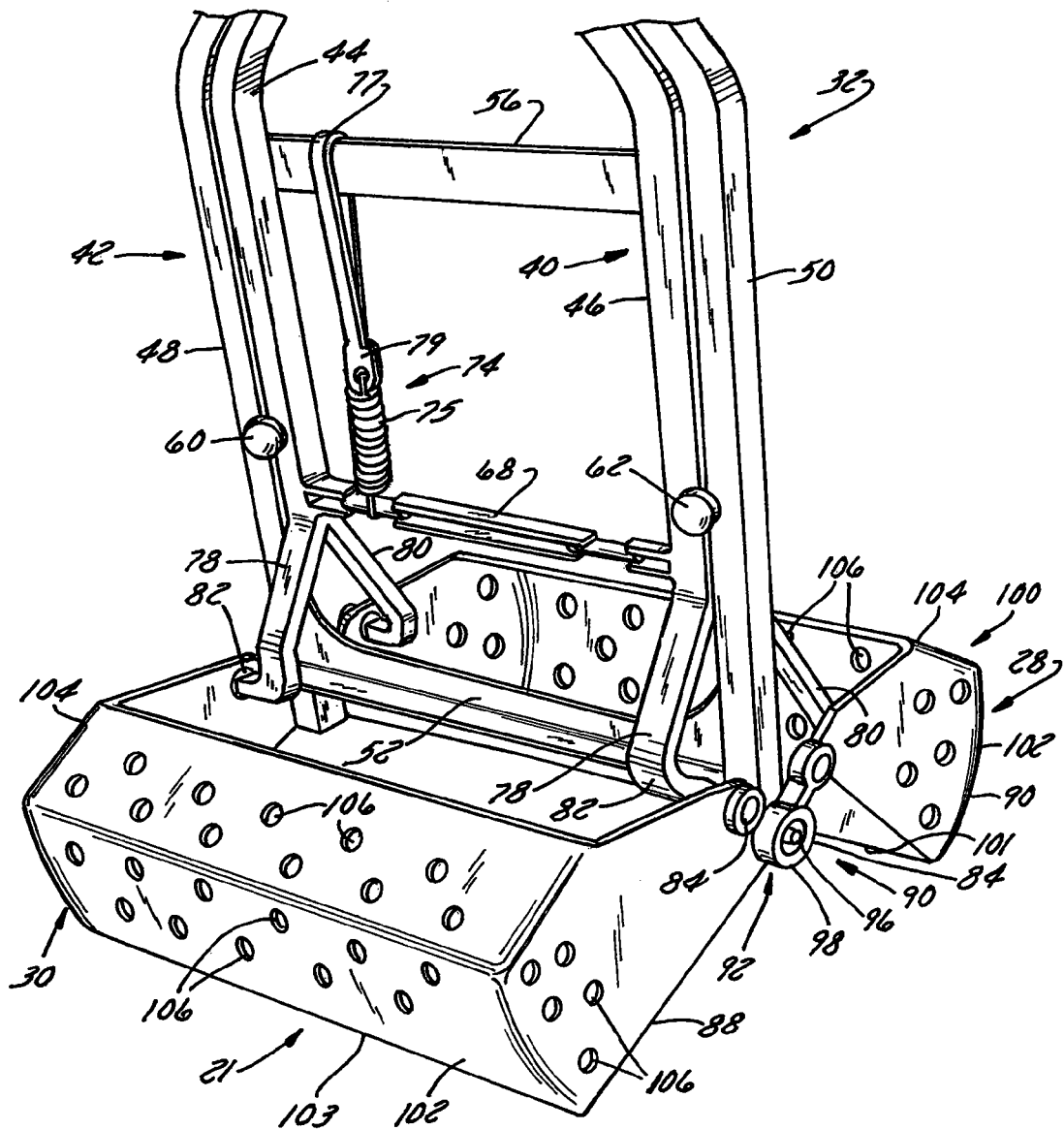
FIG. 7 is a second fragmentary perspective view of the scooper frame and jaws.
Figure 8:
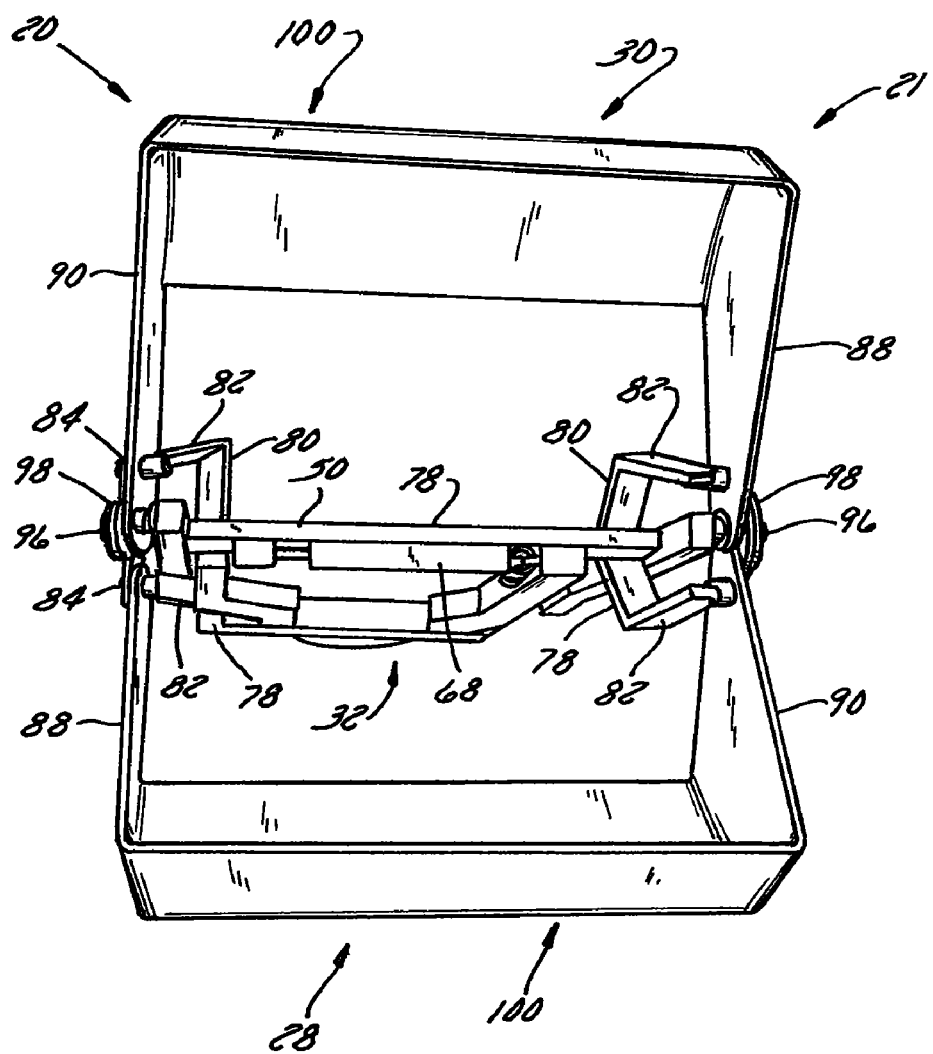
FIG. 8 is a bottom plan view of the scooper with the jaws open.
Figure 9:
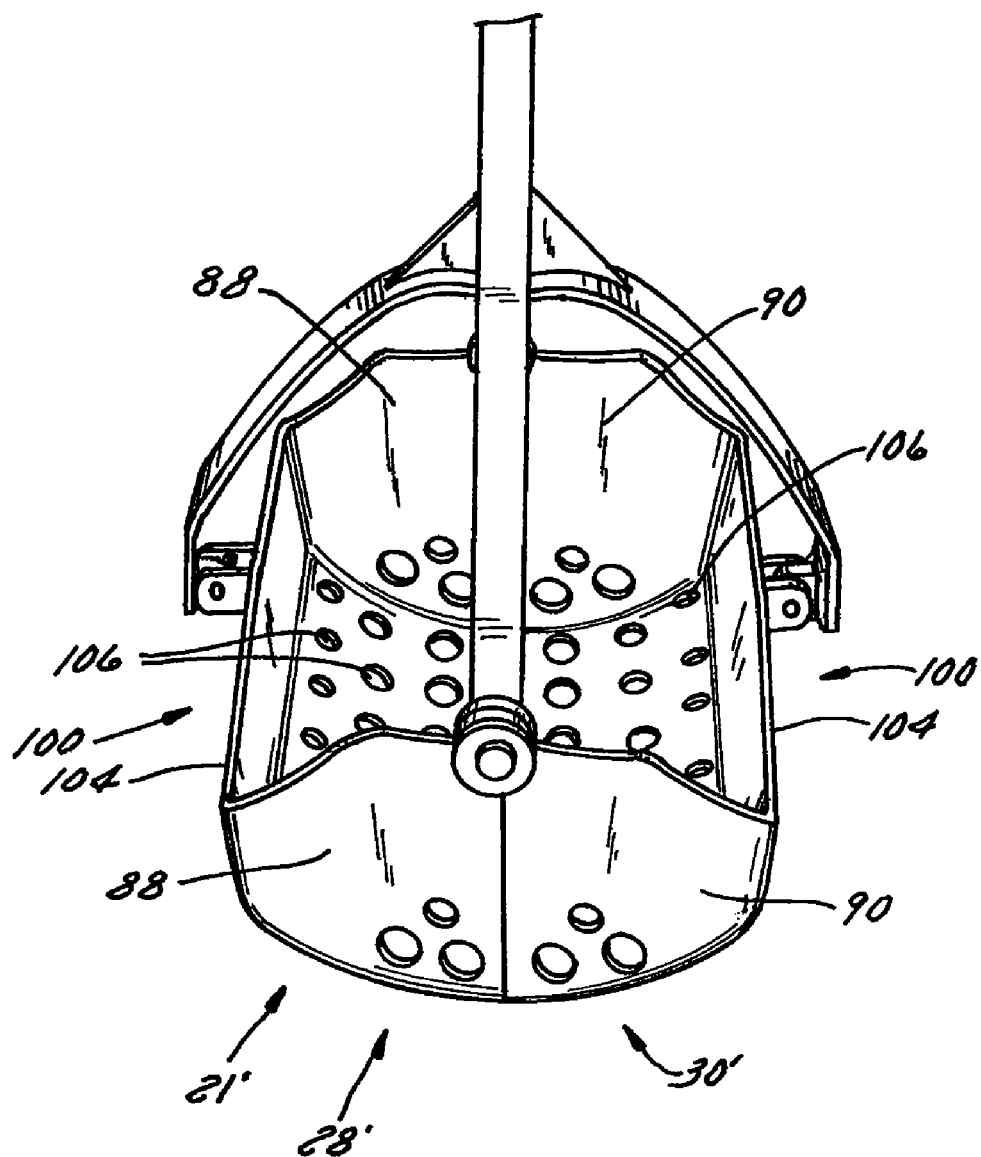
FIG. 9 is a perspective view of a second preferred scoop bucket embodiment equipped with perforate jaws disposed in a closed position.

With specific reference to FIGS. 6 and 7, adjacent and above the scoop bucket 21 is a plurality of pairs of guide tabs 60, 62 that extend inwardly from opposite outer frame rails 48, 50 on either side of a corresponding inner frame rail 44, 46. Together, the guide braces 52, 54, 56, the guide tabs 60, 62 and the outer frame rails 48, 50 form a slide arrangement 38 that guides relative movement of the inner frame rails 44, 46 during scoop operation.

Both sets of frame rails 44, 46, and 48, 50 can have a necked down section 64 that is configured to limit how much one set of frame rails, e.g. inner frame rails 44, 46, can move relative to the other set of frame rails, e.g. outer frame rails, 48, 50, as well as for preventing disassembly. Of course, if desired, another configuration or arrangement can be used to limit over travel. In the preferred embodiment shown in FIGS. 1-8, the inner rails 44, 46 define a connector in the form of an elongate linkage that operatively connects part of the handle 34 to the scoop jaws 28 and 30.

To help strengthen and structurally rigidify the inner frame 40, the scooper 20 shown in the drawing figures includes an interconnecting gusset 66 that extends between the inner frame rails 44, 46 at or adjacent its necked down section 64 at or near the middle of the inner frame 40. Reinforcing flanges 70, 72 extend longitudinally along each outer frame rail 48, 50 in the necked down section.

With reference to FIGS. 6 and 7, there is a strut 68 that extends between the inner rails 44, 46. There is a biasing arrangement 74 coupling the bottom-most guide brace 56 of the outer frame 42 to the strut 68 of the inner frame 40 in manner that causes the scoop jaws 28, 30 to pivot away from each other towards an open position. The biasing arrangement 74 includes a biasing element 75 that is shown in FIG. 6 as being a coil spring in tension having one end attached to strut 68 of the inner frame 40 and its other end attached to a link 77 that is attached to guide brace 56 of the outer frame 42. Such a link 77 can be a cable tie equipped with a spring mounting loop 79 or the like. If desired, spring 75 can be directly coupled to the aforementioned braces without the use of any link 77. In the preferred embodiment depicted in FIGS. 1-8, the biasing arrangement 74 is constructed and arranged to urge the scoop jaws 28, 30 toward an open pedestal position where it can be stood upright on the jaws 28, 30 such that the open jaws function as a pedestal 76.

Figure 4:
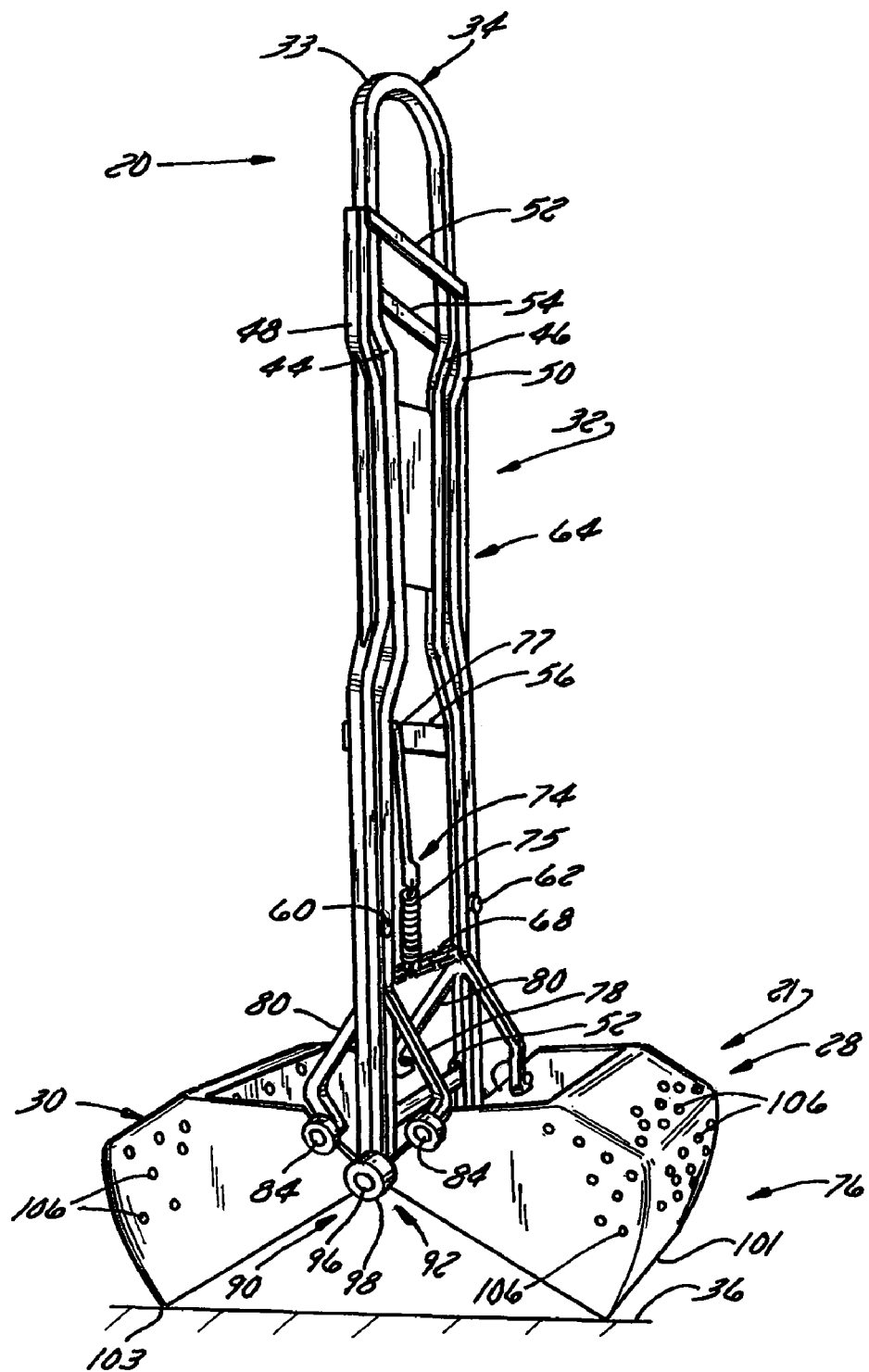
FIG. 4 is a side elevation view of the scooper of FIG. 1 with its jaws open such that the jaws form a pedestal or integral stand upon which the scooper rests in a self-supporting upright manner.
Figure 5:
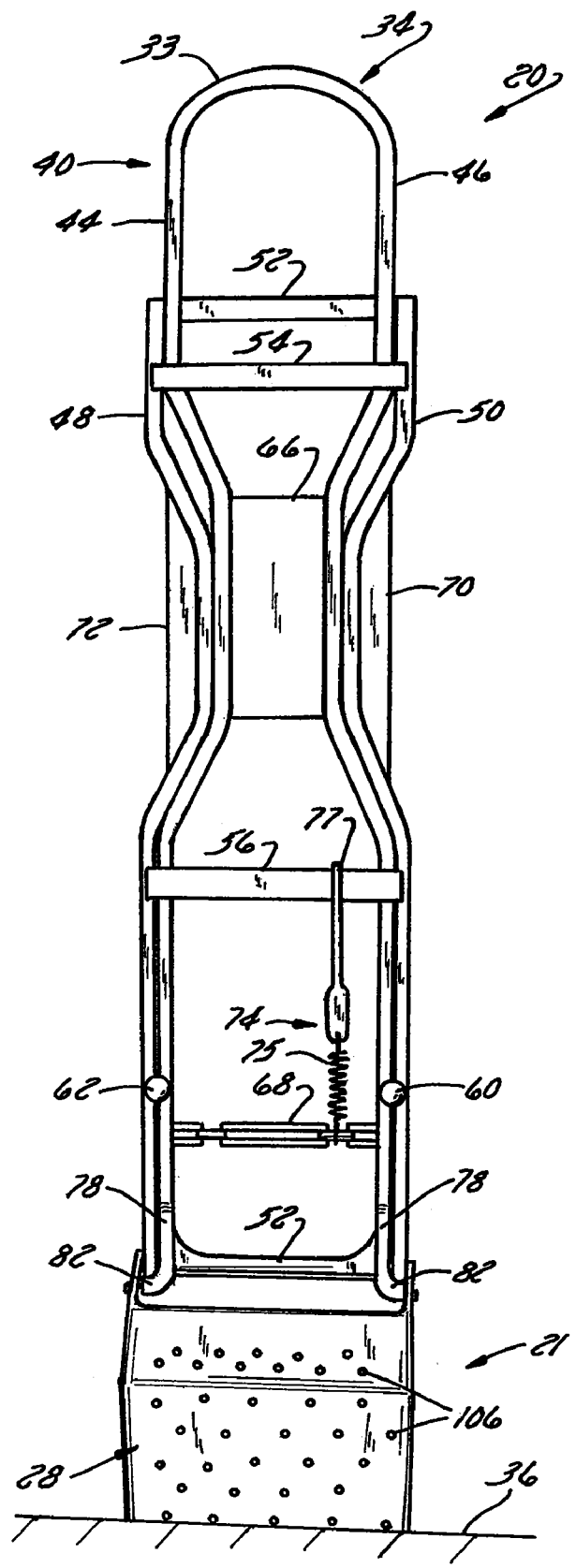
FIG. 5 is a front elevation view of the litter scooper of FIG. 1 with its jaws open and forming a scooper pedestal or stand.

When disposed in the open pedestal position, such as is depicted in FIG. 4, each scoop jaw 28, 30 has a bottom or outer edge 101, 103 spaced far enough apart from each other to define a pedestal 76 that has a broad base so as to stably remain upright when stood thereon. In a preferred embodiment, the jaws 28, 30 open relative to one another when in an open pedestal position so as to space the pedestal support edges 101, 103 apart at least four inches with each edge having a length of at least two inches thereby providing a sufficiently stable pedestal 76.

With specific reference to FIG. 7, each inner frame rail 44, 46 has a pair of outwardly extending scoop jaw drive arms 78, 80 that each includes a mount 82 at its free end from which a pivot 84 projects that is received in a bore formed in an adjacent scoop sidewall 88, 90 of adjacent scoop jaws 28, 30. Each pair of adjacent sidewalls 88, 90 also overlaps along a corner 92 and has an ear with a hole in it that receives a main pivot 96 that projects outwardly from an adjacent outer frame rail 48, 50 at or adjacent the bottom end of the frame rail. A washer 98 or the like that overlies the ears can be used to help keep the scoop jaws 28, 30 on the pivot 96.

Figure 10:
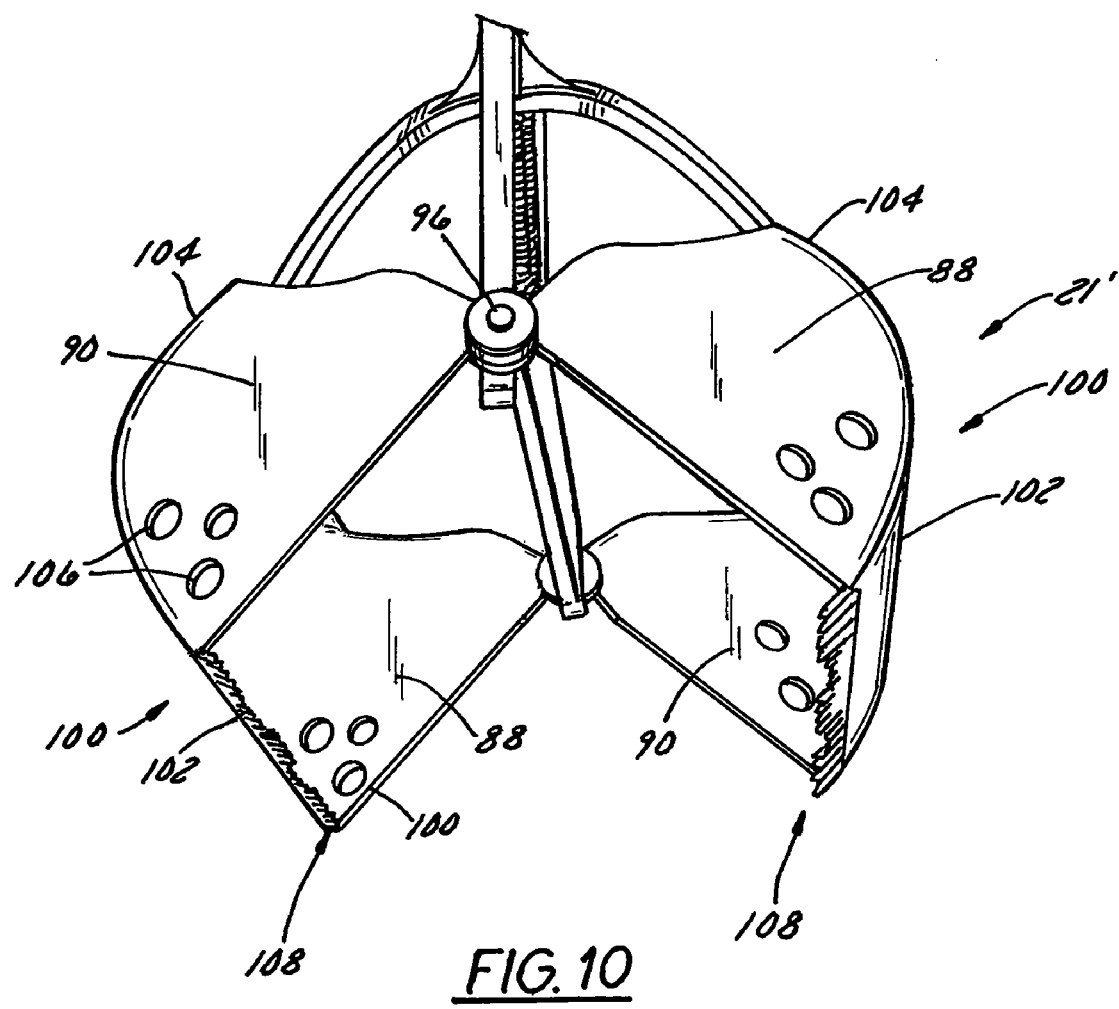
FIG. 10 is a bottom perspective view of the perforate scoop bucket shown in FIG. 9 with the perforate jaws in an open position.
Figure 11:
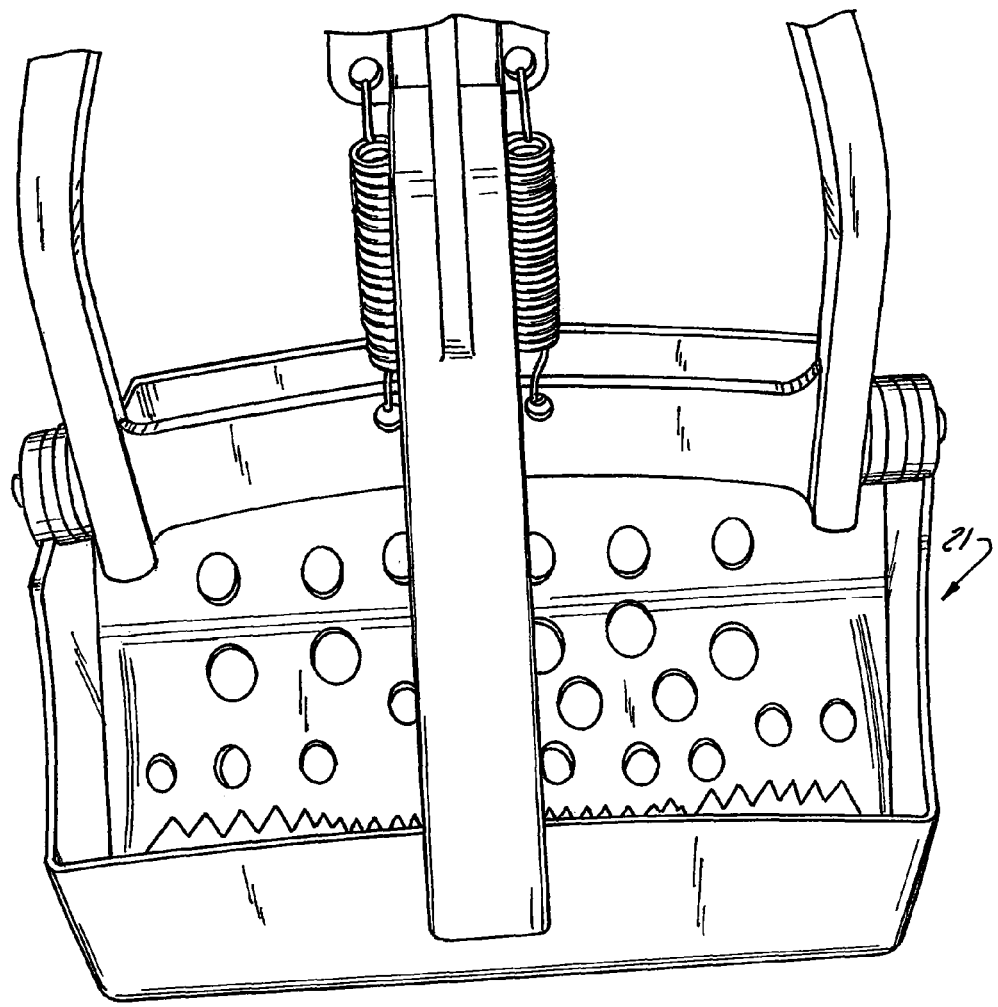
FIG. 11 is a front perspective view of the perforate scoop bucket shown in FIG. 9.
Figure 12:
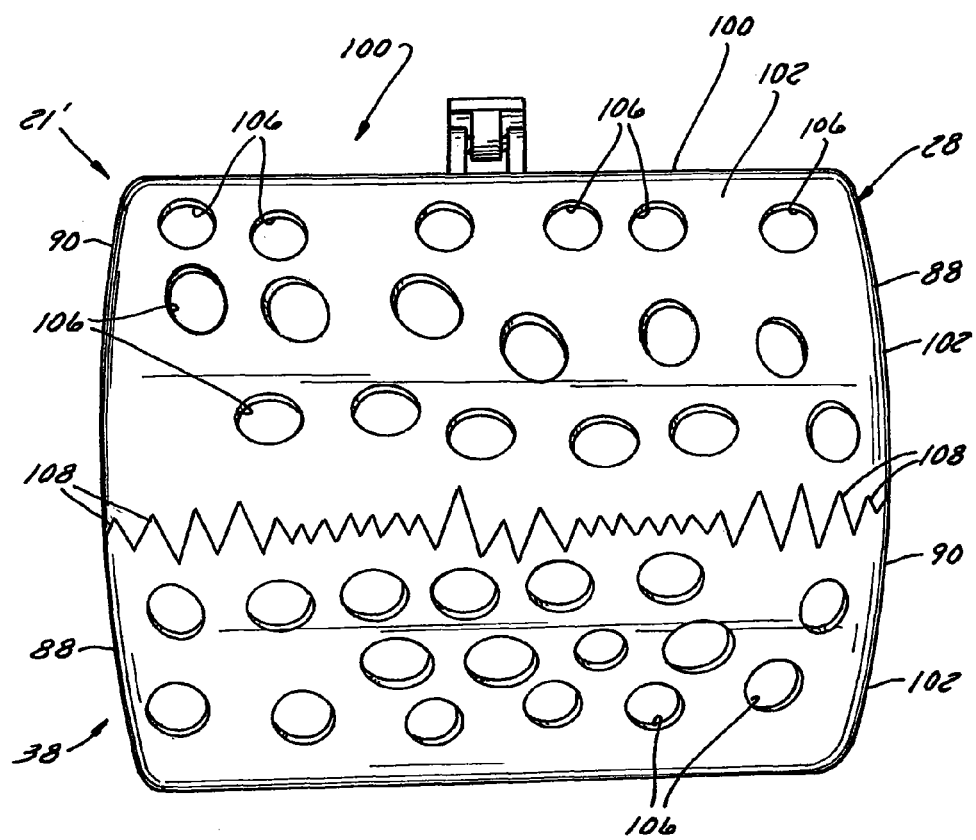
FIG. 12 is a bottom plan view of the perforate scoop bucket shown in FIG. 12.

Referring additionally to FIGS. 9-12, another preferred embodiment of a bucket 21' is depicted that has a pair of scoop jaws 28', 30' each formed of a pair of sidewalls 88, 90 interconnected by a front wall 100. The front wall 100 has a curved segment 102 that extends along the bottom of the bucket 21' when the scoop jaws 28', 30' are closed and a generally planar segment 104 above the curved segment 102. As is shown in FIG. 10, the outer or bottom edge of each scoop jaw 28, 30 have teeth 108 that intermesh when the bucket 21' is closed. Such teeth 108 can also help the scooper 20 remain upstanding in litter 24 when placed uprightly in the litter 24 with the scoop jaws 28, 30 open. If desired, one or both scoop jaws 28, 30 can have relatively smooth edges, can have toothed edges, or can have one smooth edge and one toothed edge. If desired, one of the edges can be configured to enable raking or smoothing of the litter after feces and/or clumped urine spot removal. This provides multiple scraping and raking options for users.

In the preferred scoop embodiment shown in FIG. 9-12, the curved segment 102 has at least a plurality of pairs, i.e. at least three, of perforations 106 and each scoop jaw sidewall 88, 90 has at least a plurality of perforations 106. Where perforated, each perforation 106 can be a round hole having a diameter that is typically between one-eighth inch and one-half inch. In one embodiment, at least a plurality of perforations 106 in each scoop jaw 28, 30 are round holes having a diameter of about three-eighths inch. Of course, where not round, the perforations have a size that corresponds to one or more of the aforementioned diameters disclosed herein for optimal flow of unspoiled litter therethrough.

In one embodiment, perforation hole sizes vary with hole size and distribution or placement of sizes being based on their scoop jaw location to help maximize the amount and rate of return of unspoiled litter 24 to the litter box 26. In another embodiment, smaller holes 106 are disposed between larger holes 106 to help maximize perforation surface area, which helps speed draining of unspoiled litter 24 from the bucket 21'.

With reference to FIG. 3, during operation, as the upper guide brace 52 and top portion 33 of handle 34 are grasped and squeezed, the inner frame functions as a connector 40 that displaces downwardly relative to the outer frame 42 causing the scoop drive arms 78, 80 extending from each inner rail 44, 46 to respectively rotate each scoop jaw 28, 30 toward each other closing the scoop jaws 28, 30 around fecal matter clumps 22 (as well as around clumps where urine has been absorbed by litter) in the litter 24 in the litter box 26. As the scoop jaws close around the feces clumps 22, the jaws 28, 30 also scoop some unspoiled litter 24. As the scooper 20 is lifted from the litter box 24 with its jaws 28, 30 disposed in the closed position, unspoiled litter 24 flows from within the scoop bucket 21' through the perforations 106 back into the litter box where it is once again available for use. This advantageously minimizes use of litter and helps maximize litter life.

The fecal matter scooper 20 is then manipulated over a trash receptacle or the like, the handle 34 is released such that the biasing arrangement 74 moves the connector 40 upwardly relative to the frame 42 causing the scoop drive arms 78, 80 to pivot the scoop jaws 28, 30 away from each other opening the scoop bucket 21'. As the bucket 21' opens, the feces clumps 22 fall into the trash receptacle. Since the scoop jaws 28, 30 are biased open by the biasing arrangement, the scooper 20 can easily be planted in an upright position in litter in the litter box in the manner shown in FIG. 1 or placed upon its pedestal formed by the open scoop jaws 28, 30, such as in the manner depicted in FIGS. 4 and 5.

Figure 13:
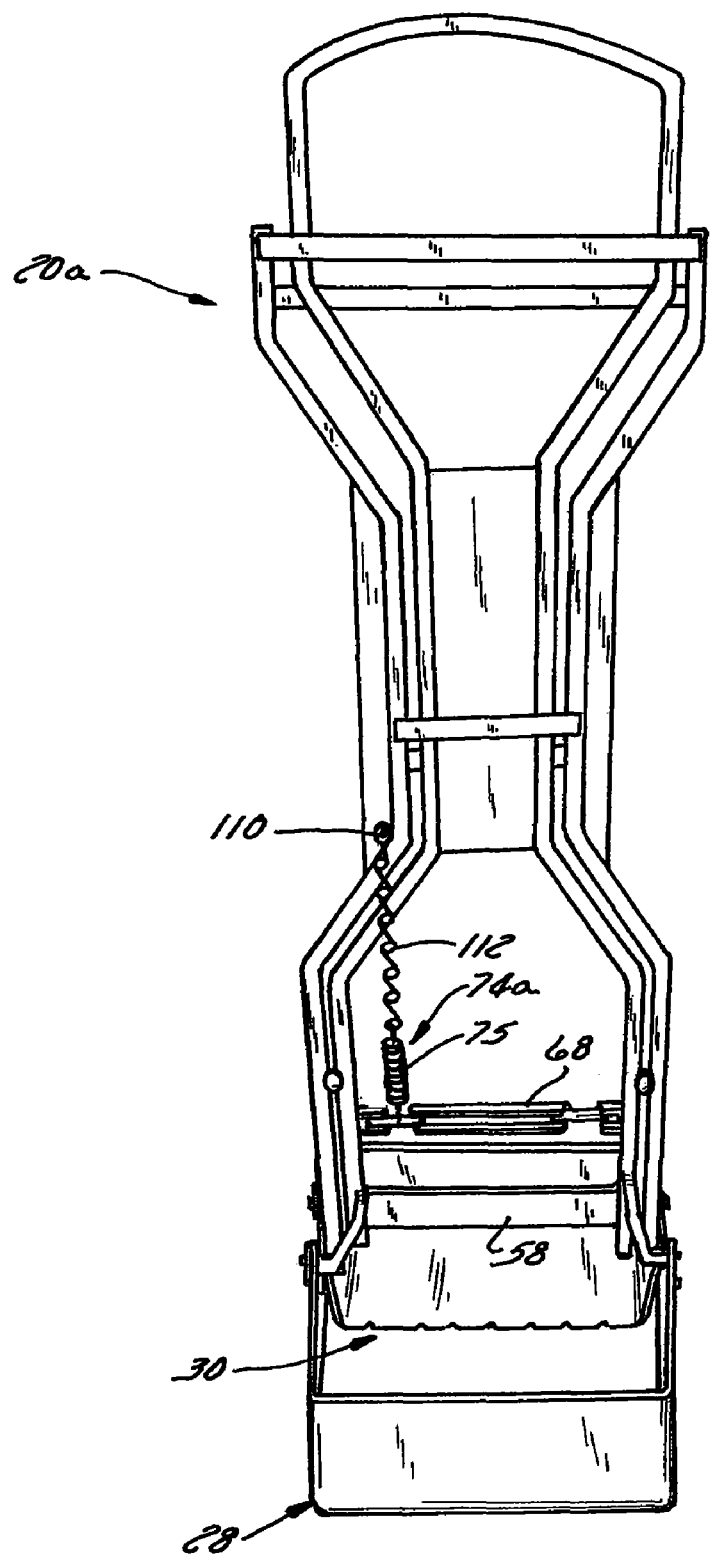
FIG. 13 illustrates a second preferred embodiment of a fecal matter scooper constructed in accordance with the present invention that is equipped with another preferred biasing arrangement.

FIG. 13 illustrates an embodiment of a fecal matter scooper 20a that is similar to the scooper 20 shown in FIGS. 1-8 except that the biasing arrangement 74a is anchored to a portion of outer frame rail 48 adjacent reinforcing flange 72 using a fastener 110. In addition, link 77 has been replaced with a resilient linkage arrangement 112, such as a chain. Guide brace 56 is omitted.

Figure 14:
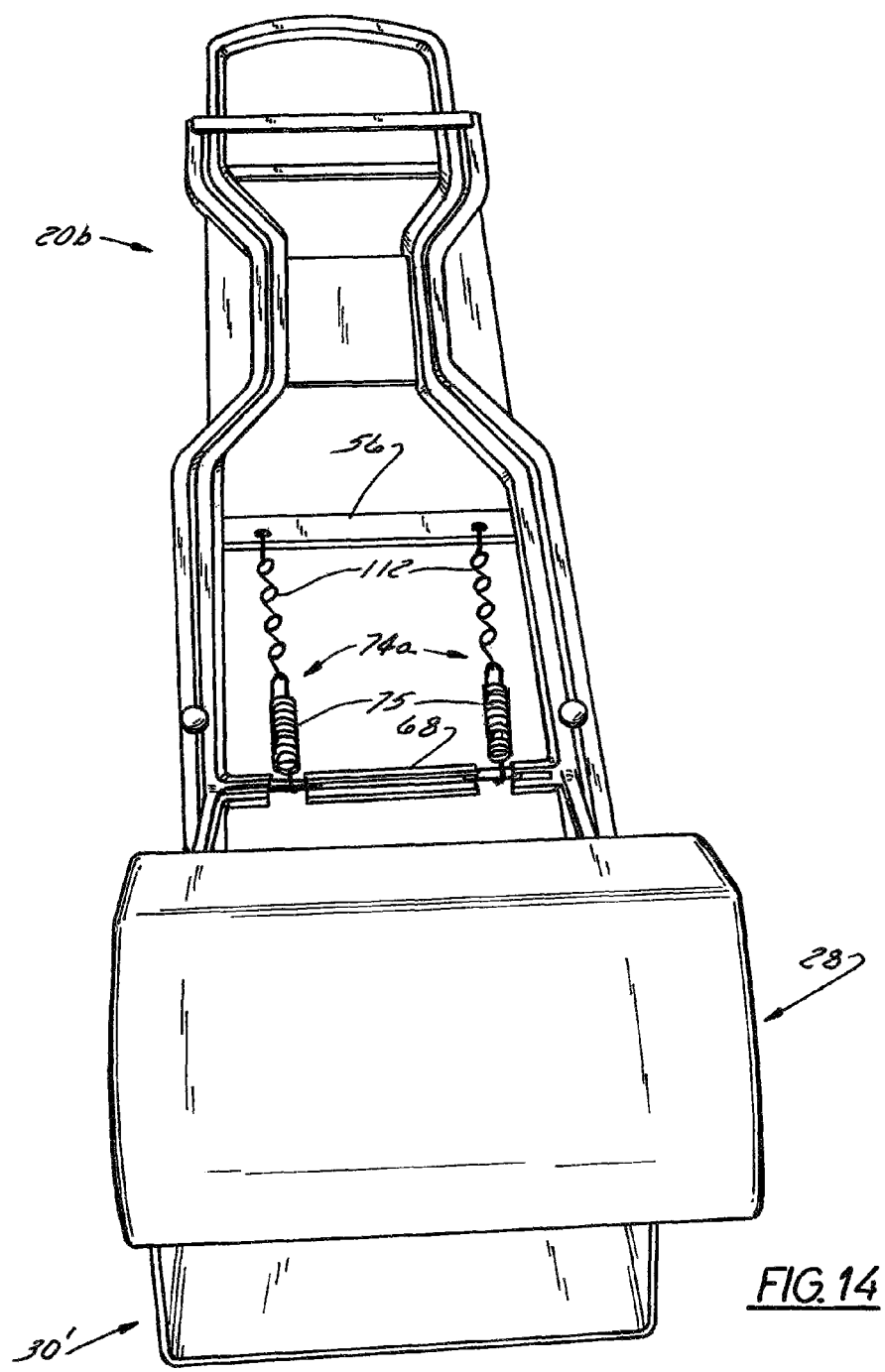
FIG. 14 illustrates a third preferred fecal matter scooper embodiment that has a plurality of spaced apart scoop bucket jaw biasing arrangements.
Figure 15:
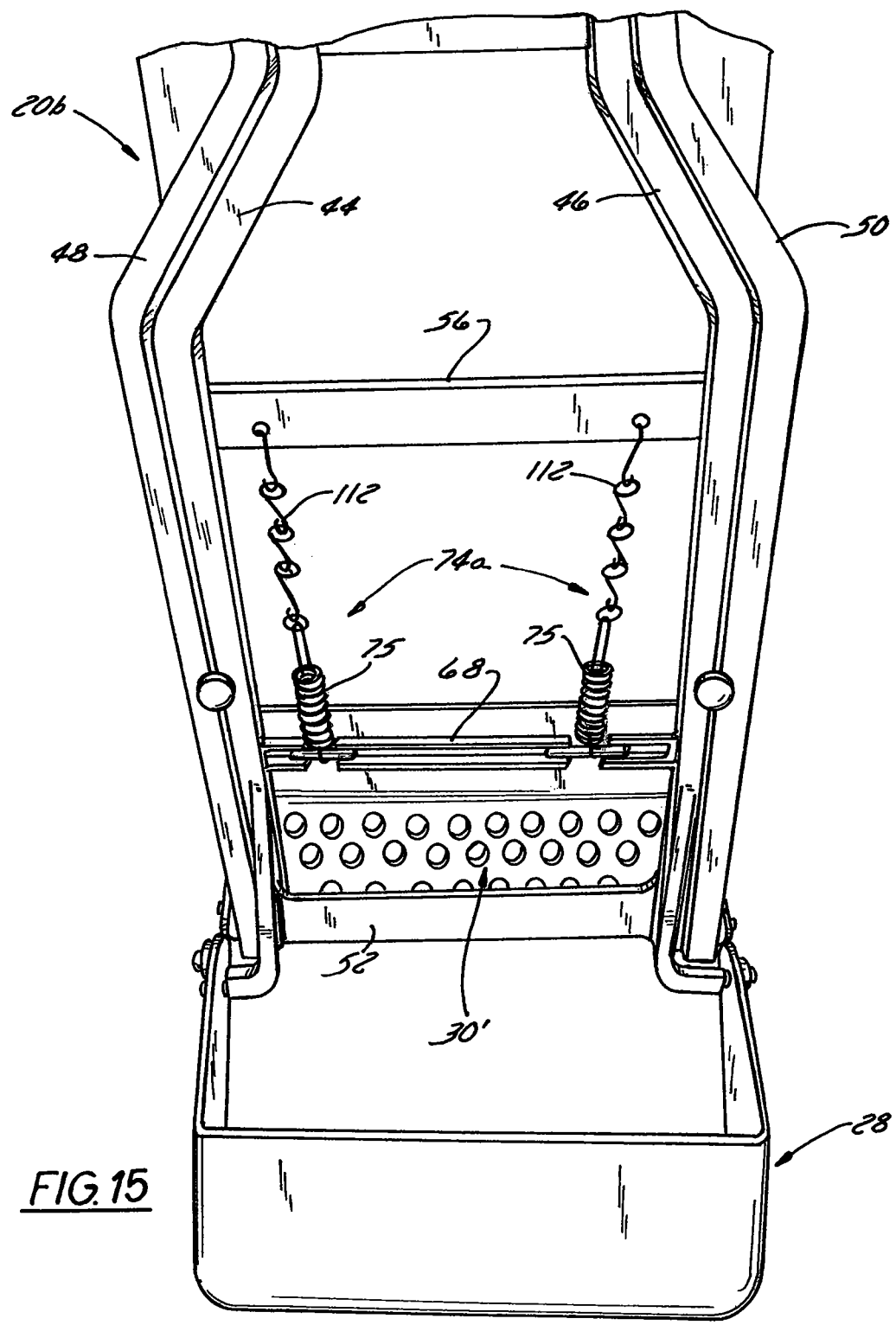
FIG. 15 is a top perspective view of the scooper embodiment of FIG. 14 having one scoop jaw that is perforated and the other scoop jaw that is imperforate with the scoop jaws in an open position.

FIGS. 14-15 illustrate another embodiment of a fecal matter scooper 20b that is also very similar to the scooper 20 shown in FIGS. 1-8. To the extent it is different, it has a pair of biasing arrangements 74a spaced apart, in parallel, and attached directly to guide brace 56. In addition, it has one scoop jaw 28 that is imperforate and its other scoop jaw 30' that is perforate, such as is shown in FIG. 15. Each biasing arrangement 74a includes a coil spring that is connected in tension so as to urge the scoop jaws apart toward the open pedestal position.

Figure 16:
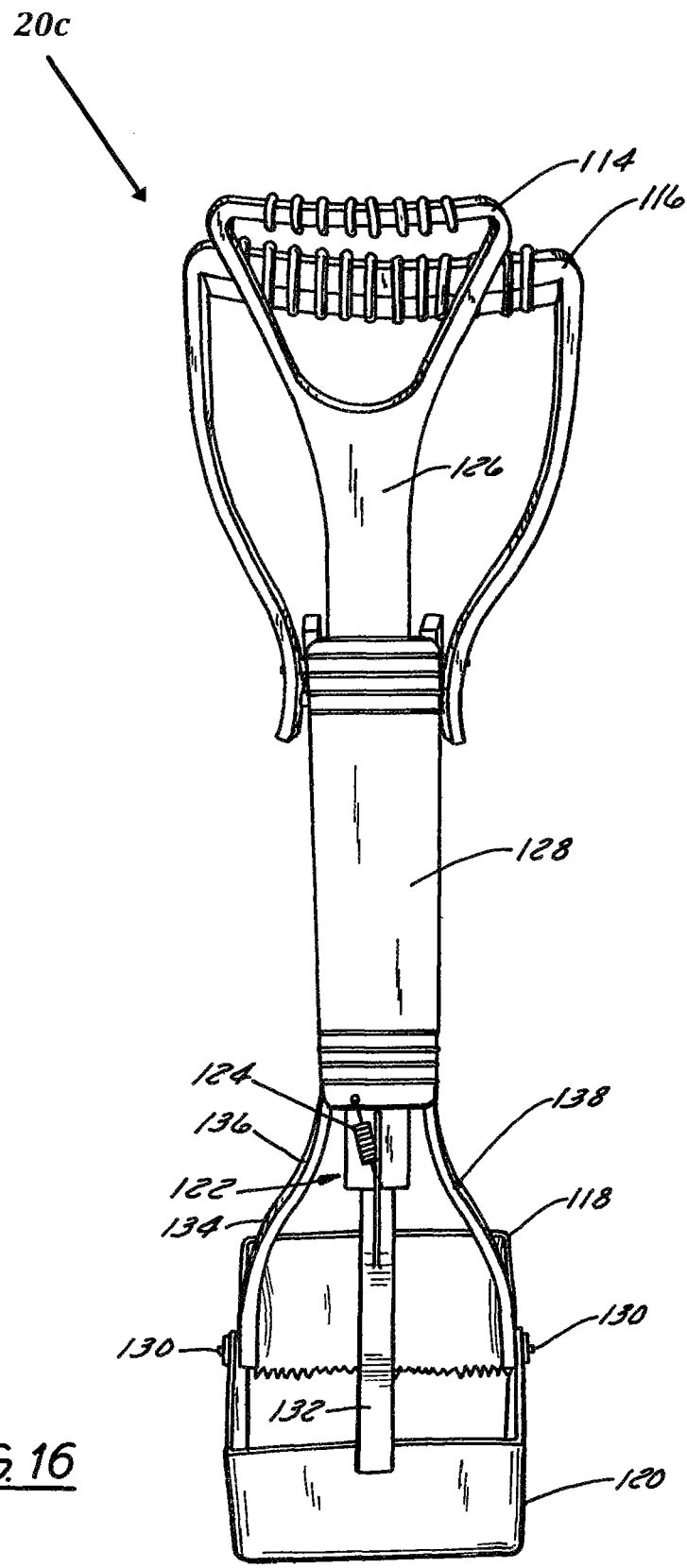
FIG. 16 is a top, front perspective view of a third scooper embodiment that illustrates another preferred handle arrangement.
Figure 17:
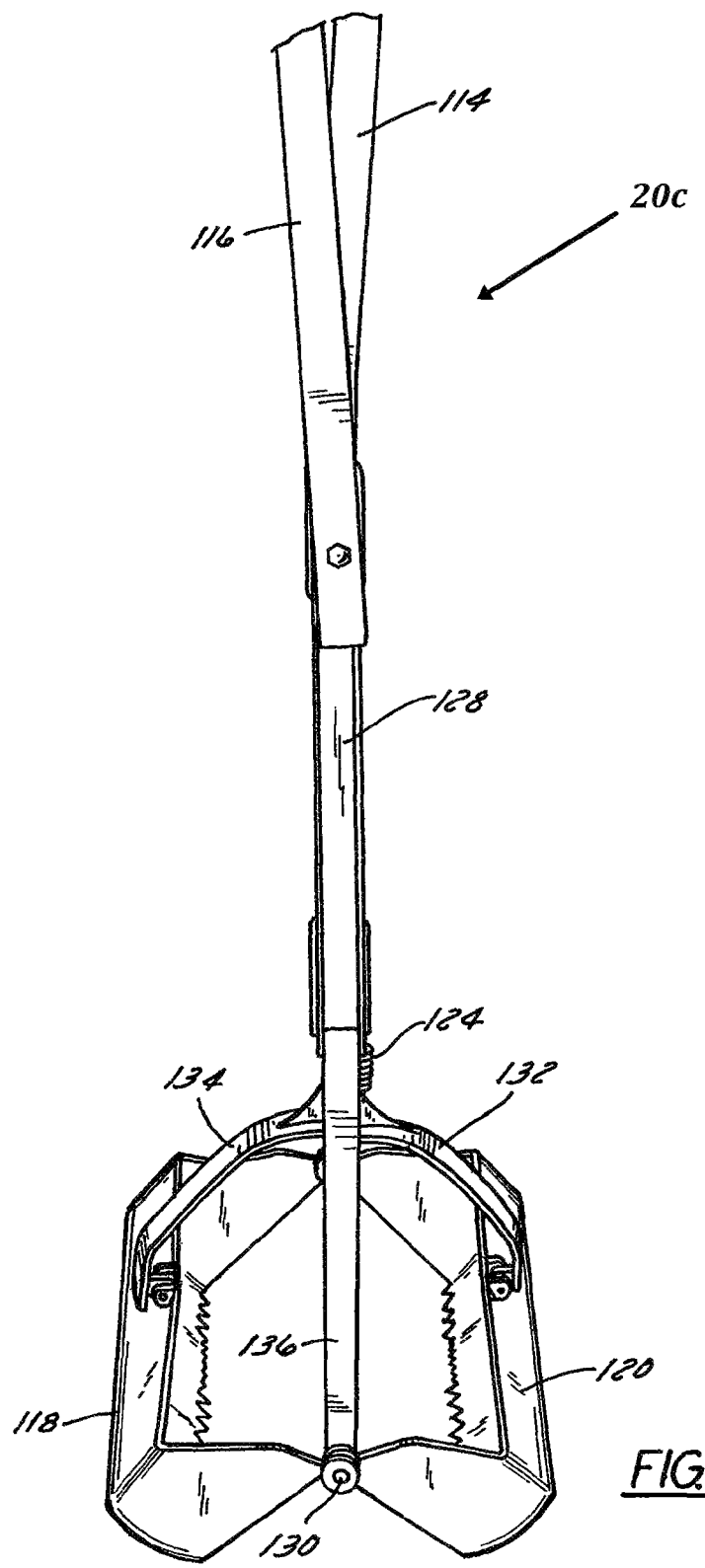
FIG. 17 illustrates a side perspective view of the scooper embodiment of FIG. 16.
Figure 18:
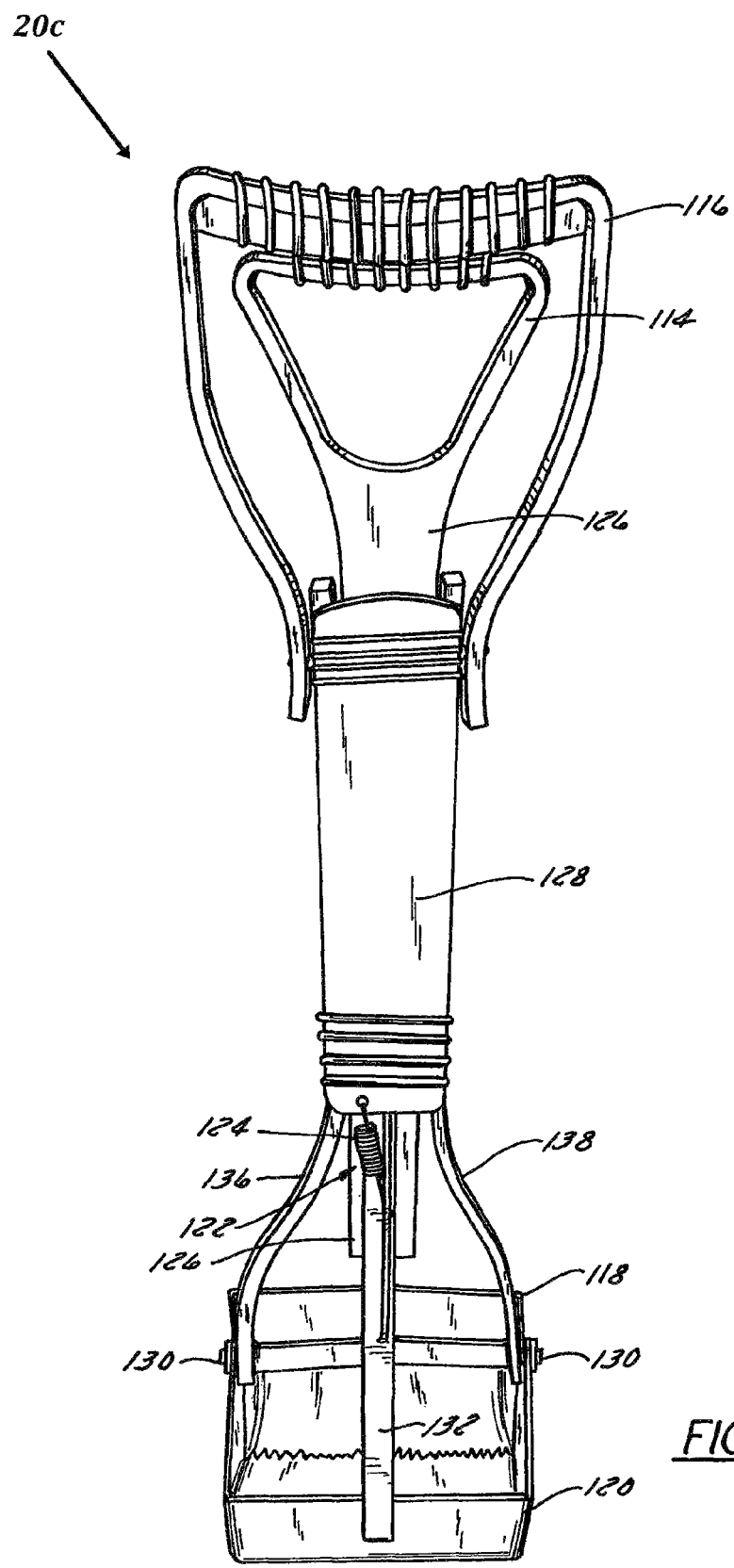
FIG. 18 illustrates a top, front perspective view of the scooper embodiment of FIG. 16 with its jaws in a closed position.

FIGS. 16-18 illustrate still another embodiment of a fecal matter scooper 20c that is constructed in accordance with the present invention. Scooper 20c has a pair of handles 114, 116 that cooperate with a pair of scoop jaws 118, 120 that can be of perforate construction. One of the handle portions 114 moves a central drive connector rod 126 that is slidably, telescopically constrained in a tubular outer frame sleeve 128 that also acts as a guide or support therefor. The other one of the handle portions 116 is fixed to the tubular outer frame sleeve 128 such that relative movement between the handle portions 114, 116 opens and closes the scoop jaws 118, 120. A biasing arrangement that includes a biasing element 122, such as a coil spring 124 attached in tension, biases the scoop jaws 118, 120 toward an open position, such as the open position shown in FIG. 16. Although one coil spring 124 is shown, a plurality of springs can be used.

The biasing element 122 urges or pulls the drive connector rod 126 upwardly thereby displacing handle 114 so it is positioned above handle 116 opening the scoop jaws 118, 120. When the handle portions 114, 116 are grasped and brought together through manipulation by a user, resultant relative movement between the drive connector rod 126 and the tubular outer frame sleeve 128 causes the scoop jaws 118, 120 to pivot toward one another about central pivot 130 until toothed edges of each jaw 118, 120 engage or abut. As the drive connector rod 126 moves downwardly relative to the outer frame sleeve 128, it displaces a pair of outwardly extending drive arms 132, 134 that are each pivotally attached to a corresponding scoop jaw 118, 120. This causes each scoop jaw 118, 120 to rotate towards each other about pivot 130 toward a closed position, such as the closed position shown in FIG. 18. The outer frame sleeve 128 has a pair of fixed arms 136, 138 to which the central pivot 130 is attached. When the handle portions 114, 116 are released by the user, spring 124 automatically pivots the scoop jaws 118, 120 away from each other toward the open pedestal position enabling the fecal matter scooper 20c to be stood uprightly on its outer or bottom edges of both scoop jaws 118, 120 presenting the handle portions 114, 116 in a manner that allows a user to grasp and use the scooper 20c without having to bend over.

It is understood that the various preferred embodiments are shown and described above to illustrate different possible features of the invention and the varying ways in which these features may be combined. Apart from combining the different features of the above embodiments in varying ways, other modifications are also considered to be within the scope of the invention.

It is claimed:

1. A litter-sifting fecal matter scooper comprising:
a manipulable handle;
an elongate handle arrangement extending outwardly from the manipulable handle comprising (a) a frame arrangement and (b) a connector operatively coupled to the handle;
a pair of opposable scoop jaws (a) with one of the scoop jaws movable relative to the other one of the scoop jaws in response to manipulation of at least a portion of the handle between an open position and a closed position where the jaws engage forming a litter-sifting scoop bucket in which fecal matter is releasably retained, and (b) with at least one of the jaws comprised of perforate litter-sifting construction;
at least one spring grounded to the frame arrangement and operatively connected to one of the connector and at least one of the scoop jaws that biases at least one of the scoop jaws toward an open position;
wherein the connector operatively couples the handle to at least one of the scoop jaws such that squeezing of the handle displaces the at least one of the scoop jaws relative to the other one of the scoop jaws toward the closed position; and
wherein one of the scoop jaws is urged into engagement with the other one of the scoop jaws when the manipulable handle is squeezed.

2. The litter-sifting fecal matter scooper of claim 1 wherein the frame arrangement comprises an elongate tubular sleeve and the connector is received in the elongate tubular sleeve.

3. The litter-sifting fecal matter scooper of claim 2 wherein the connector comprises an elongate drive connector rod.

4. The litter-sifting fecal matter scooper of claim 3 wherein the manipulable handle comprises a pair of handle portions with one of the handle portions attached to the frame arrangement and the other one of the handle portions attached to the drive connector rod.

5. The litter-sifting fecal matter scooper of claim 2 wherein the manipulable handle comprises a pair of handle portions with one of the handle portions carried by the frame arrangement and the other one of the handle portions attached to the connector.

6. The litter-sifting fecal matter scooper of claim 5 wherein the handle comprises (a) a palm rest formed by a portion of one of the frame arrangement and the connector and (b) a hand grip formed by a portion of the other one of the frame arrangement and the connector.

7. The litter-sifting fecal matter scooper of claim 1 wherein the at least one spring comprises a coil spring grounded to the frame arrangement by being operatively connected to the frame arrangement.

8. The litter-sifting fecal matter scooper of claim 1 wherein the scoop jaws define a flat-surface supporting pedestal when the scoop jaws are disposed in the open position.

9. The litter-sifting fecal matter scooper of claim 1 wherein the pair of scoop jaws are each comprised of perforate litter-sifting construction.

10. The litter-sifting fecal matter scooper of claim 9 wherein the pair of scoop jaws each comprise a curved segment that is of perforate litter-sifting construction.

11. The litter-sifting fecal matter scooper of claim 9 wherein the pair of scoop jaws are each comprised of a plurality of litter-sifting perforations formed therein sized to permit litter to flow out of the closed scoop jaws while retaining clumps of fecal matter in the scoop jaws when closed.

12. The litter-sifting fecal matter scooper of claim 1 wherein the manipulable handle comprises a palm rest and wherein both jaws are movable towards the closed position when the manipulable handle is squeezed.

13. A litter-sifting fecal matter scooper comprising:
a manipulable handle;
a pair of opposable perforate scoop jaws having one of the scoop jaws movable relative to the other one of the scoop jaws in response to manipulation of the handle between an open position and a closed position where the jaws engage forming a litter-sifting scoop bucket in which fecal matter is releasably retained;
an elongate handle arrangement extending outwardly from the handle comprising an elongate frame arrangement and an elongate connector operatively coupling the handle and the one of the scoop jaws that is movable relative to the other one of the scoop jaws;
a spring connected to the frame arrangement and the one of the scoop jaws urging the one of the scoop jaws toward the open position;
wherein the one of the scoop jaws is urged toward the closed position when the handle is squeezed; and
wherein one of the frame arrangement and the connector comprises a tubular portion and the other one of the frame arrangement and the connector has at least a portion that disposed inside the tubular portion.

14. The litter-sifting fecal matter scooper of claim 13 wherein the frame arrangement comprises the tubular portion and the spring is operatively connected to the tubular portion of the frame arrangement and one of the scoop jaws.

15. The litter-sifting fecal matter scooper of claim 13 wherein the spring comprises a coil spring connected in tension between the tubular portion of the frame arrangement and the one of the scoop jaws urging the one of the one of the scoop jaws toward an open position.

16. The litter-sifting fecal matter scooper of claim 13 wherein squeezing the manipulable handle moves each one of the pair of scoop jaws substantially simultaneously toward the closed position, and wherein release of the manipulable handle causes each one of the pair of scoops to substantially simultaneously move toward the open position.

17. The litter-sifting fecal matter scooper of claim 13 wherein at least one of the scoop jaws has a plurality of litter-sifting perforations sized to permit litter to flow out of the closed scoop jaws while retaining clumps of fecal matter in the scoop jaws when closed.

18. A litter-sifting fecal matter scooper in combination with a litter box containing granular or particulate litter comprising:
a litter box comprising a container containing granular or particulate litter in which at least one clump of fecal matter larger than particles or grains of the litter is disposed; and
a litter-sifting fecal matter scooper comprising:
(a) a manipulable handle;
(b) a pair of opposable and perforate litter-sifting scoop jaws in operable cooperation with the manipulable handle with at least one of the scoop jaws movable relative to the other one of the scoop jaws in response to manipulation of at least a portion of the handle between an open position and a closed position where the scoop jaws form a litter-sifting scoop bucket in which fecal matter is releasably retained;
(c) a handle arrangement comprised of a an elongate tubular frame and a connector housed by the frame that is operatively connected to (1) the manipulable handle and (2) at least one of the pair of the scoop jaws;

(d) a biasing arrangement comprising a spring connected to the at least one of the scoop jaws that biases the at least one of the scoop jaws toward an open position; and wherein the pair of scoop jaws are urged toward the closed position when the manipulable handle is squeezed.

19. The litter-sifting fecal matter scooper in combination with the litter containing litter box of claim 18 wherein the spring comprises a coil spring, the connector comprises an elongate rod, and wherein one of the scoop jaws is urged into engagement with the other one of the scoop jaws when the manipulable handle is squeezed.

\* \* \* \* \*